Figure 1:
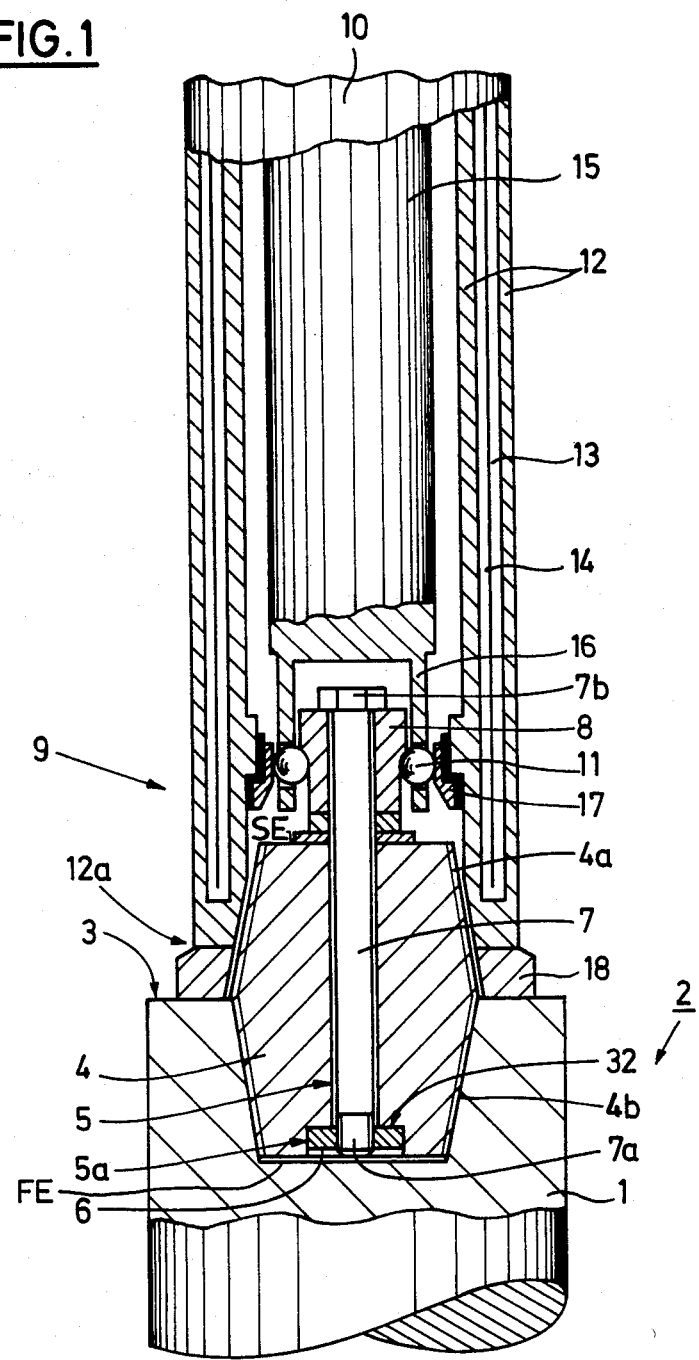

United States Patent [19]

Reimpell et al.

[11] Patent Number: 4,495,624
[45] Date of Patent: Jan. 22, 1985

[54] GRAPHITE ELECTRODE NIPPLE

[76] Inventors: Uwe Reimpell, Burgallee 136; Anton Wamser, Karl-Bierschenkstrasse 8, both of D-6450 Hanau am Main; Otto Stenzel, Am Mühlrain 18a, D-6466 Gründau-4; Wilhelm Burgmann, Latrasse, F-71670 Issy-L'Evéque, all of Fed. Rep. of Germany

[21] Appl. No.: 321,978

[22] Filed: Nov. 16, 1981

[30] Foreign Application Priority Data

Nov. 17, 1980 [DE] Fed. Rep. of Germany ....... 3043318

[51] Int. Cl.$^3$ .......................... H05B 7/14; H05B 7/08
[52] U.S. Cl. ......................................... 373/93; 373/92
[58] Field of Search ........................ 373/91, 92, 93, 94

[56] References Cited

U.S. PATENT DOCUMENTS

| 3,046,319 | 7/1962 | Daley | 373/94 |
| 3,293,347 | 12/1966 | Wooding | 373/94 |
| 3,526,699 | 9/1970 | Usherwood | 373/94 |
| 4,287,381 | 9/1981 | Montgomery | 373/92 |

FOREIGN PATENT DOCUMENTS 402867 9/1924 Fed. Rep. of Germany ........ 373/92

Primary Examiner—Roy N. Envall, Jr.
Attorney, Agent, or Firm—Felfe & Lynch

[57] ABSTRACT

A graphite nipple projecting from one end of a graphite electrode portion of the type used in an electric furnace has a supporting face for receiving a non-graphite portion of a clamping device in shape-locking engagement for holding the electrode for use. It also has a conventional screw-thread surface for joining the nipple to another electrode portion for extending the electrode. The supporting face does not alter the conventional screw-thread surface arrangement for joining electrode portions so that specially-shaped and thus costly electrode-supporting nipples are not required in addition to the conventionally-shaped nipples for joining electrode portions, and a graphite screw-thread does not have to be unscrewed for the same, which unscrewing frequently broke the nipple or electrode portion.

8 Claims, 7 Drawing Figures

GRAPHITE ELECTRODE NIPPLE

The invention concerns a graphite nipple of the type for assembling and supporting electrode portions in an electric furnace.

In contrast to fusible electrodes, graphite electrodes are often referred to as "permanent electrodes" although they, too, are continuously consumed. The consumption is caused by a gradual burning off at the tip of the electrode and, to some extent, at the periphery of the electrode near the tip. Other "consumption" is attributable to breakage of the electrode. In each case, the consumed or broken part of the electrode must be replaced and, in what are called open electric-arc furnaces for example, the whole electrode costs on the order of 17% of the total operating costs of the furnace.

The graphite electrodes are therefore provided in portions interconnectable by graphite nipples which have the shape of two truncated cones merging at their largest diameters. Each conically-tapering surface of the nipples is provided with a screw thread, and the ends the electrode portions have complementary internal threads, whereby they can be screwed to the nipples in such a way that the largest diameter of each nipple lies at the end-faces between two electrode portions. It has been found, however, that a screw connection of this kind can only be released for replacing the electrode portions, as described above, with very great difficulty, particularly if the electrode has been in operation and the screw connection has reached a fairly high temperature.

In the majority of cases, graphite electrodes assembled in this way are held in furnaces by their longitudinal surfaces. The electric operating current is also supplied through the holding arrangement. An electrode holder of this kind is described in DE-AS 23 03 509; however, it calls for a relatively complicated mechanism for holding and adjusting the electrode in a furnace.

For simplifying the way an electrode is held and adjusted, it is desirable to fit one end of the electrode in an electrode holder which can be regarded as an axial extension of the electrode. An electrode holder of this type, which, in principle, can also be used with the invention, is described in DE-PS 1 293 360 for holding metallic fusible electrodes. Its design principle has proved extremely reliable because it divides the holder into a part which takes up the forces and a cooled part which carries the current.

DE-OS 28 11 877 discloses a similar electrode holder which is suitable for graphite electrodes. It, however, requires a specially-shaped electrode end portion which encloses the shank and head of a tierod. The specially-shaped electrode end portion is screwed onto a solid nipple projecting from the next portion of the electrode. Further, in order to enable the specially-shaped electrode end portion to support the mechanical load of the electrode, it further requires a specially-shaped metallic connector having a collar which overlaps a tapered contact surface on the end of the specially-shaped electrode end portion. Still further in order to replace the next electrode portion to try to save the specially-shaped end portion, the specially-shaped electrode end portion must be released from the nipple therebetween, and this is usually possible only by destroying the specially-shaped electrode end portion at least sufficiently that it cannot be reused with the tierod and the connector. The known arrangement has therefore been found to be in need of improvement as regards the problem of releasing a screw-thread consisting exclusively of graphite.

CH-PS 153 951 discloses a graphite electrode having intermediate portions interconnected by graphite nipples. For tightening the nipple connections, an iron tierod, extends through bores in the intermediate electrode portions and into a nipple at the lowermost tip of the electrode. This requires that all of the intermediate electrode portions be bored. Furthermore, it requires that, fresh tip electrode portions be frequently fitted before the tip electrode portion burns off to the nut for the tierod in the lowermost nipple. Still furthermore, the tierod prevents the other, top end of the electrode from being used for electrode heating currentsupply, since, if it were, the heating current would take the path of least resistance and flow through the iron tierod instead of the graphite electrode and the tierod could not withstand this.

The object of the present invention is therefore to improve the electrode arrangement so that the top-end electrode portion may be used for current supply, but does not have to be specially shaped and does not require separation of a graphite screw connection, for release from the current-supplying holder. According to the invention, this object is achieved in that a graphite nipple projects from the top portion of the electrode and has, in addition to the top screw-thread, a supporting face whereby a part of the electrode holder that is not made of graphite can be brought into engagement in a shape-locking manner.

In the arrangement in accordance with the invention, the shape-locking clamping is achieved, not by a graphite-graphite screw connection, but by a specially integrated supporting face. This can be much better suited to the high surface load as the examples of construction will show.

A specially shaped top electrode portion, which for reasons of economy would have to be used several times, is no longer required. Each formerly top electrode portion is gradually displaced downwardly by "nippling-on" further top-end portions until it is consumed, so that a new portion is always present at the most heavily loaded top end of the electrode. The nipples travel with the electrode portions into the burning zone of the electric arc where they are consumed. In particular, however, release of a graphite-graphite screw connection is no longer necessary; this considerably reduces the number of electrode breakages when inserting a new portion and during operation. It also is no longer necessary to have a connector of the kind which overlaps the top electrode portion with a tapered face or collar which produces radially inwardly directed compressive forces.

For this, the shape-locking clamping arrangement preferably includes metal parts. In this respect, it has to be pointed out that the fit between parts made of metal and graphite suffers from the differing coefficients of expansion and elastic moduli, so that further possible sources of trouble are created.

Adding a new top electrode portion is of course possible only when the electrode is removed from the electrode holder. Then, all that is necessary is to screw a fresh electrode portion on to the upper half of the nipple. If a special tierod is present as in some of the examples of construction, the tierod has to be removed from the nipple first and then has to be refitted in the next nipple brought into the top position. The lengthened electrode can then again be fitted into the electrode holder, and the metallurgical process can be continued.

In contrast to, for example, CH-PS 153 951, there is no need to use electrode portions that have been bored right through, and that increase production costs and the amount of burning. Furthermore, there is no need for a downwardly extending tierod which has to be unscrewed and removed prior to consumption of the lowermost electrode portion. Instead, with the subject-matter of the invention, it is possible to use up completely not only the lowermost electrode portion but, if required, further electrode portions before it becomes necessary to fit new portions at the top end of the electrode. This considerably increases operational reliability, since the tierod does not have to be retightened during the fusing operation, which, in the present state of the art, would be impossible where the top end of the electrode is clamped. In the prior art arrangements, retightening becomes necessary at least for the reason that graphite and the material of the tierod have considerably differing coefficients of expansion. It is also absolutely impossible for material from the tierod or the nut for the tierod to find its way into the molten bath during fusion of the electrode portion.

In a preferred arrangement having a tierod projecting from the top end of the electrode and a connector which, in accordance with DE-OS 28 11 877, can be fitted in a shape-locking manner in the electrode holder, it is particularly advantageous if at least the top nipple is provided, over at least part of its length, with a longitudinal bore into which the tierod can be fitted in a shape-locking manner while braced on the supporting surface. In this arrangement, the tierod constitutes a component which strengthens the nipple since the portion of the nipple above the supporting face is subjected only to compressive load and this can be more readily withstood by the brittle graphite.

In the particularly advantageous case where the nipple is to be subjected mainly to compressive forces, it is proposed, in accordance with a further feature of the invention, that the nipple be bored over its entire length and, at its lower face, be provided with, for example, a metal nut into which the tierod can be screwed. While the electrode is in operation, the material of the nut fuses as soon as it moves into a zone of the electrode that has a temperature high enough for the purpose. As soon as the cavity in which the nut is located is opened by burning away of the electrode, the material of the nut flows away into the treated melt.

In the case where the metallic parts in the zone of the electrode are not intended to melt off with the electrode, it is proposed, in accordance with a further feature of the invention, that either the nut be made of a nonmetallic material, or that the nipple be provided with a transverse bore in which a metal pin is removably inserted for connecting the tierod in a shape-locking manner. Then, for example, when the tierod is removed, the metal pin can be driven out of the transverse bore.

According to a further feature of the invention, a particularly elegant and rapidly executed method of securing the clamping device is achieved if the nipple is provided with a stepped bore in which an expanding tierod can be inserted in a shape-locking manner. In this arrangement, the strength of the connection can be further increased by providing the bore with a plurality of step-like recesses into which complementary projections on the expanding portions of the tierod can be engaged.

Further advantageous forms of construction of the subject-matter of the invention are disclosed in the other, subsidiary embodiments.

Figure 2:
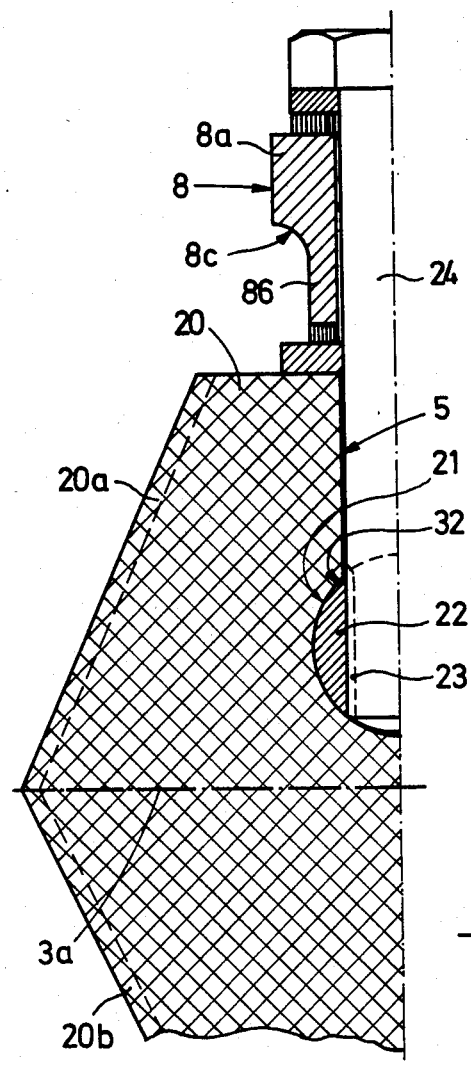
Figure 3:
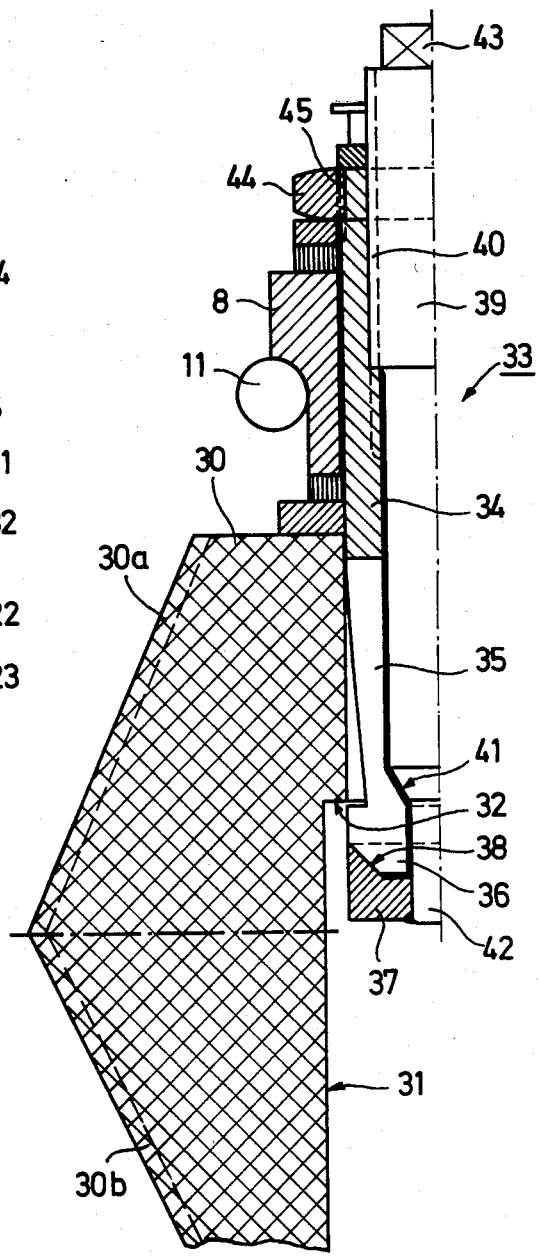
Figure 4:
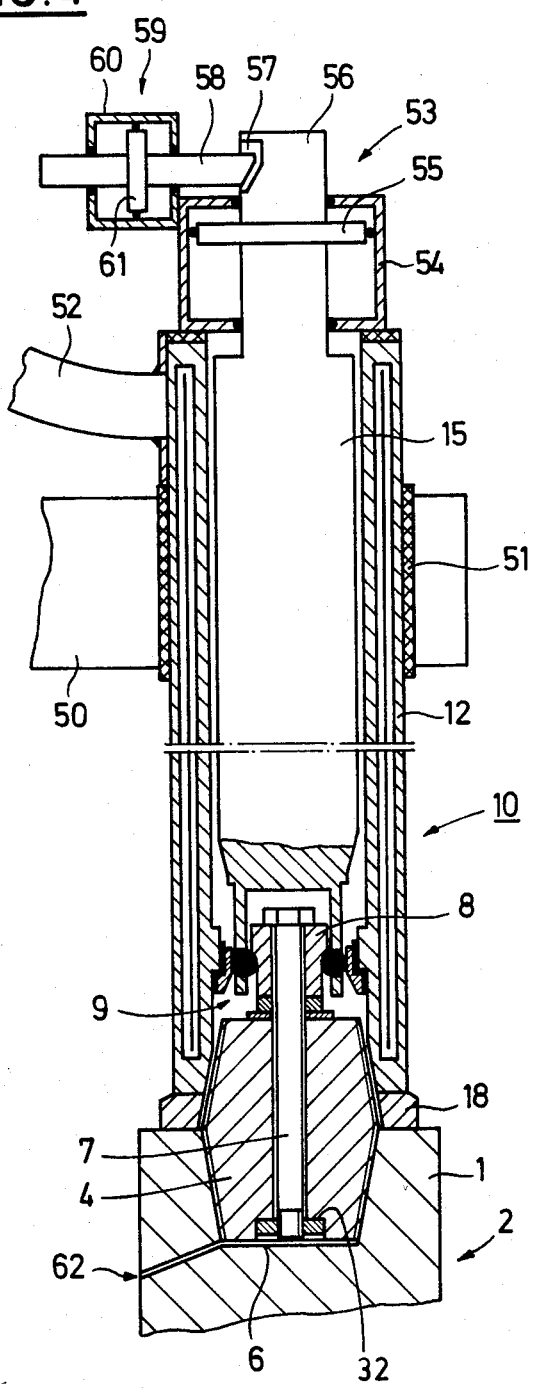
Figure 5:
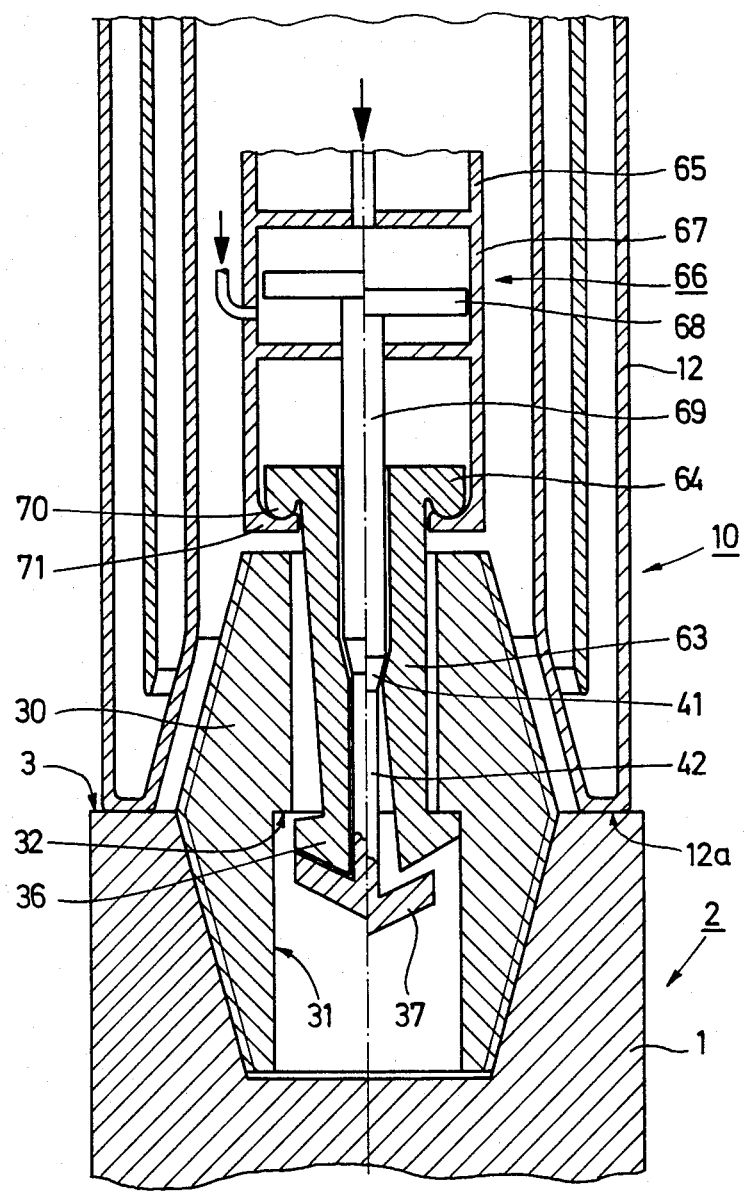
Figure 6:
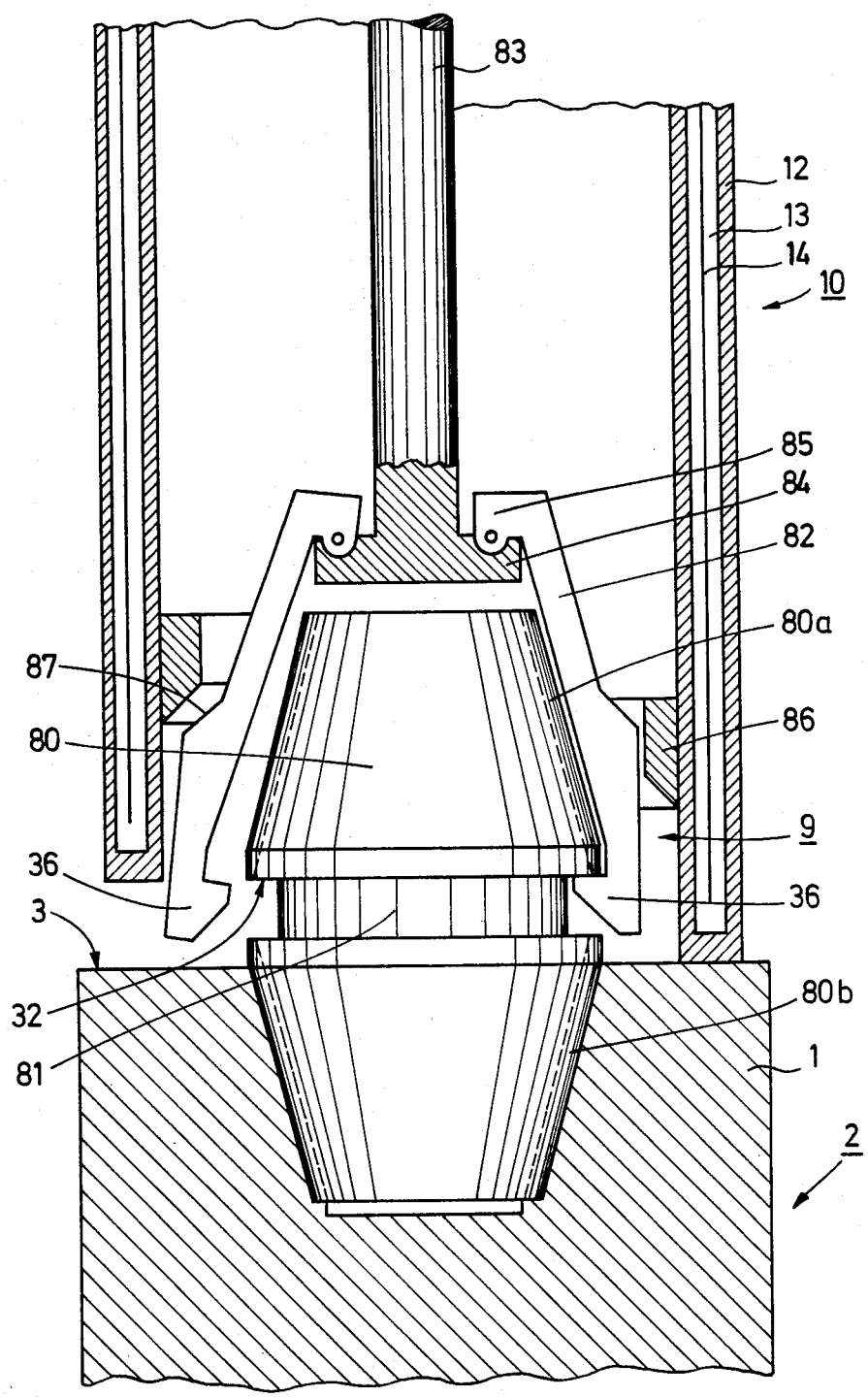
Figure 7:
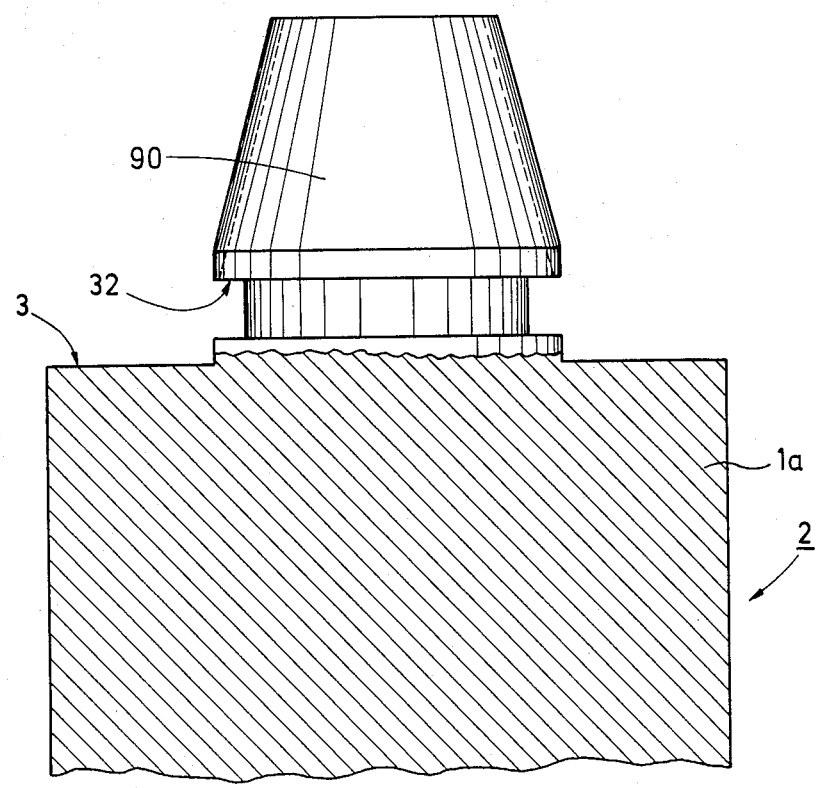

Examples of the construction of the subject-matter of the invention will now be described in greater detail by reference to FIGS. 1 to 7, wherein:

FIG. 1 shows a vertical section through the top end of an electrode together with a clamping device and electrode holder, FIG. 2 shows, likewise in vertical section, a variant of the clamping device of FIG. 1 with a tierod which is screwed into a metal pin in the upper middle part, FIG. 3 is an illustration similar to FIG. 2, but with a clamping device which comprises an expandable tie rod, FIG. 4 shows a vertical section through an electrode holder with the associated drive means, FIG. 5 shows part of the lower end of an electrode holder with an expandable retaining means, integrated in the electrode holder, and with the drive means therefor, FIG. 6 illustrates a section much the same as FIG. 5, but with the difference that, in a kinematic reversal of the conditions, the expandable retaining means engages the nipple by an inward movement, and FIG. 7 shows a modified version in which the nipple and the subjacent electrode portion are in one piece.

FIG. 1 illustrates a top portion 1 of a graphite electrode 2 which is made up of a plurality of such portions. The electrode portions are connected at end-faces 3 by nipples 4 which are likewise made of graphite and have the form of two truncated cones merging at their largest diameters. The conically-tapering surfaces of the truncated cones have screw-threads 4a and 4b. The largest diameter of each nipple is at the end-face 3.

Initially, no further portion is located at the top end of the graphite electrode 2, so that, as shown in FIG. 1, the top half of the nipple 4, i.e. the half having the screw-thread 4a, projects from the portion 1 that is topmost at the time top or second end $SE$. Consequently, a graphite-graphite connection is present only in the zone of the screw-thread 4b leading to the opposite, bottom, or first end FE, which connection does not need to be released subsequently.

The nipple 4 has a longitudinal bore 5 which, at its bottom end, has a widened portion 5a in which is inserted a nut 6 made of metal. Extending through the longitudinal bore 5 with radial play is a tie rod 7 which is screwed into the nut 6 with the aid of a screw-thread 7a provided at its lower end. In this case, the bearing surface for the nut 6 is the supporting face 32 which is of importance in the invention. The tie rod, made of a metallic material, also extends through an axially-symmetrical connector 8 which is likewise made of metal and which is pressed by the head 7b of the tie rod against the upper end face of the nipple 4 through two shims for equalizing the distribution of force. The connector 8 has two differing diameters which merge with each other by way of a toroidal surface, the larger diameter being at the top end of the connector. The parts so far described co-operate to form a clamping device 9 associated with the electrode. It suspends the graphite electrode 2 is an electrode holder 10 associated with the furnace by means of several, preferably spherical clamping members 11 which are distributed around the toroidal periphery of the connector 8.

The electrode holder 10 consists of a double-walled current-conducting tube 12 having a coolant cavity 13, in which is located a cylindrical conductive metal sheet 14. Arranged coaxially within the current-conducting tube 12 is a tie rod 15 which has at its bottom end a cylindrical cage 16 in which are mounted, radially movably, the clamping members 11. Arranged in the zone of the clamping members 11 on the inner wall of the current-supply tube 12 is a hollow tapered control element 17, a ring of insulating material being disposed between this element and the tube 12; the tapered element acts on the clamping members 11 to cause them to be displaced radially. The current-supply tube 12 and the tie rod 15 are connected at their top ends to parts of a pressure medium drive that are movable relative to each other, this drive being illustrated, for example, in FIG. 4. At its lower end the current-supply tube 12 has a contact face 12a, by way of which operating current is passed to the graphite electrode 2. This is achieved by an interposed contact ring 18 which bears against the end-face 3 of the top electrode portion 1.

The mode of operation of the equipment of FIG. 1 is as follows: As soon as the bottom end, not shown, of the graphite electrode 2 has suffered burning that renders it necessary to fit another electrode portion at the top end, the bottom end of the electrode is first placed on an underlying support by means of the electrode holder 10 during a break in operations. The current-supply tube 12 is then raised by means of the drive, not shown, so that the clamping members 11 are able to move outwardly and release the connector 8. The graphite electrode 2, together with its clamping device 9, is then removed from the furnace.

Following this, the tie rod 7 is unscrewed from the nut 6 so that the connector 8 and the two shims can also be removed from the nipple 4. Thereafter, a fresh electrode portion is screwed at its bottom end on to the screw-thread 4a and is tightened in the usual manner. This fresh electrode portion carries at its top end a nipple identical to nipple 4 which is either already fitted to a tie rod 7 and connector 8 or is provided with these parts at a later stage by screw connections. The graphite electrode 2 is then extended by a fresh portion, like portion 1, and the nipple 4, shown in FIG. 1, is moved downwards the length of the fresh electrode portion. By means of its connctor 8, the electrode is then refitted in the electrode holder 10, i.e. in the cage 16 associated therewith, whereafter the current-supply tube 12 is lowered. As this happens, the tapered control element 17 presses the clamping members 11 against the toroidal face of the connector 8 and immobilizes it in a shape-locking manner. At the same time, the contact face 12a is pressed, by way of the contact ring 18, against the end-face 3, so that the required conditions for low transfer resistance can be maintained. FIG. 1 in particular shows that the cooling action of the current-supply tube 12 extends to the immediate vicinity of the actual contact faces, so that the clamping device can be kept at a lower temperature in its most critical part. If the drive system for the electrode holder 10 has a certain degree of inherent resilience, which is the case with a pneumatic drive, the connection between the electrode and the electrode holder has a well-defined resilience so that a transverse force directed on to the graphite electrode can be absorbed in a resilient manner. It has also been found that, in this arrangement, neither tensile or bending forces nor thermal expansion act on the nipple 4 sufficiently to result in its breakage.

FIG. 2 illustrates a nipple 20 having screw-threads 20a and 20b. The position of the end-face of the electrode portion is indicated by the dash-dot line 3a. In the zone of that part of its length that projects from this electrode portion the nipple 20 has a transverse bore 21, in which is releasably inserted a metal pin 22. The metal pin 22 has, in the direction of the axis of the nipple 20, a transverse bore having a screw-thread 23 into which bore is inserted a tie rod 24 which—for the same size of nipple—has a shorter length than the tie rod 7 shown in FIG. 1. The connector 8 is identical to that of FIG. 1, i.e. it has two cylindrical portions 8a and 8b which join each other by way of the toroidal surface 8c. When a fresh electrode portion is to be attached to the nipple, the procedure in the case of the FIG. 2 arrangement is that—after removal of the electrode—the tie rod 24 is unscrewed from the metal pin 22, whereupon the latter can be driven out of the transverse bore 21. Following this, the fresh electrode portion is secured on the screw-thread 20a. It is also possible to provide a tie rod otherwise like the tie rod 24 with a transverse bore aligned with bore 21 and to drive a metal pin through this transverse bore, which pin must, of course, have a smaller diameter than the tie rod 24. In either case, the bearing surface of the metal pin with the transverse bore is the supporting face 32 that is of importance in the invention.

FIG. 3 shows a nipple 30 which has screw-threads 30a and 30b and has a stepped bore 31 coaxially formed therein. At the zone of transition from one diameter to a different diameter, the stepped bore has a radial supporting face 32. Inserted in the stepped bore 31 is an expandable tie rod 33 with which is associated a sleeve 34 which has several slots extending in the longitudinal direction about its periphery such that a plurality of fingers 35 with hook-shaped ends 36 are formed therebetween. The material of the sleeve 34 has elastic properties, and the fingers are of such shape that the hook-shaped ends are directed radially inwards when in the stress-free condition, as illustrated in FIG. 3. However, the inward-bending of the fingers 35 is not an imperative requirement, since a retraction device 37 having a hollow tapered face 38 enables the fingers 35 to be bent inwards even when opposed by external forces. This is necessary, for example, when the fingers 35 are held in a mechanically positive manner in their outermost positions by the weight of the graphite electrode.

Located within the sleeve 34 is an expanding mandrel 39 which, by way of rotation tang 43 and screw-thread 40, co-operates in an axially displaceable manner with the unslotted part of the sleeve 34. In the zone of the hook-shaped ends 36, the expanding mandrel 39 has a conical control means 41 whereby the fingers 35 can be brought into engagement with the supporting face 32 of the stepped bore 31 when the expanding mandrel 39 is moved downwards. Located below the conical control means 41 is an extension 42 to which the retraction device 37 is secured.

The tie rod 33 shown in FIG. 3 is introduced into the stepped bore 1 in the unstressed condition (as illustrated). Then the expanding mandrel 34 is moved downwards so that the hook-shaped ends 36 are brought into engagement with the supporting face 32 with the aid of the tapered control element 41, the fingers 35 bearing mainly on the generated surface of the narrower part of the stepped bore 31. For this reason, the supporting face 32 has to be at a suitably great distance from the upper end-face of the nipple 30. Thereafter, a nut 44 is tightened on an outer screw-thread 45 of the sleeve 34 against the connector 8 which has the same geometry as the connectors shown in FIGS. 1 and 2. The only difference is that relating to the provision of an insulating member between the connector 8 and the sleeve 34. After tightening to the required extent, the tie rod 33 is safely secured in the nipple 30. By means of suitable counter-nuts, not shown, the tightened condition is maintained unchanged.

Graphite electrodes having the clamping devices shown in FIGS. 2 and 3 can then be readily inserted in an electrode holder similar to that illustrated in FIG. 1.

Parts shown in FIG. 4 that are the same as those in FIG. 1 are designated by the same reference numerals. FIG. 4 illustrates the way the electrode holder 10 is secured to furnace parts. The current-supply tube 12 is secured to a carrier arm 50 associated with the furnace frame in an arrangement which inverts the relative movement of the system shown in FIG. 1. Insulation 51 is provided between said tube and arm. The current-supply tube 12 is connected directly to a current lead 52. At the upper ends of the current-supply tube 12 and the tie rod 15 is located a pressure medium drive 53. It consists of a cylinder 54 connected to the current-supply tube and a piston 55 connected to the tie rod 15. Depending upon whether pressurized medium is admitted above or below the piston 55, the tie rod 15 can be raised or lowered relative to the carrier arm 50 so that the clamping device 9 is actuated. Whereas, in the FIG. 1 arrangement, the weight of the current-supply tube 12 keeps the clamping device on the electrode when there is a drop in pressure, clamping would cease in the FIG. 4 arrangement. To prevent this, the tie rod 15 has an extension 56 in which is formed a recess 57 wherein a transverse bolt 58 associated with a hydraulic or pneumatic locking device 59 engages. This device likewise consists of a cylinder 60 and a piston 61 which is connected to the transverse bolt 58. When a drop in pressure occurs, the transverse bolt 58 remains in engagement with the recess 57 so that downward movement of the tie rod 15 is possible over only a short distance which causes no harm and does not suffice to release the clamping device 9.

It will also be seen that an air-discharge bore 62 is provided in the portion 1 of the graphite electrode 2 at the lower end of the bore for receiving the nipple 4. This bore 62 serves to prevent the build-up of air pressure between the nipple and the electrode portion. Furthermore, the molten metal from the nut 6 can flow away (if this point on the electrode reaches melting temperature) so that, in the event of resolidification of the metal of the nut and of renewed heating up, inconvenient thermal stresses do not occur at this point.

FIG. 5 illustrates a variant of the FIG. 3 arrangement wherein an expanding member 61 remains in the electrode holder 10 until such time as its replacement becomes necessary. The nipple 30 is shaped in substantially the same way as that shown in FIG. 3, i.e. it has a stepped bore 31 with a supporting face 32. In this case, however, the expandable member 63 consists of a plurality of substantially C-shaped hooks which are formed integrally with a connector 64. In this case, too, the tie rod and the connector 63/64 project from the top end of the electrode for insertion into the electrode holder 10. Whereas the current-supply tube 12 is of substantially the same form as in FIGS. 1 and 4, the tie rod 65 is differently shaped at its bottom end from the tie rod 15 of FIGS. 1 and 4. At the lower end of the tie rod 65 is a pressure medium drive 66 which consists of a cylinder 67 and a piston 68. An expanding mandrel 69, similar in shape to that shown in FIG. 3, is connected to the piston 68. This expanding mandrel also incorporates a tapered control means 41 and an extension 42 with a retraction device 37. The parts forming the expanding member 63 are each of sectorial shape in cross-section, and each sector has a hook 36 at one end and, at the other end, a downwardly rounded arm 70 which engages in a complementary rounded face of an inwardly extending annular flange 71 on the lower end of the tie rod 65.

In the left-hand half of FIG. 5, the expanding member 63 is shown in a closed position, whereas in the right-hand half it is depicted in the maximally expanded position. The expanding member 63 is inserted, while in the position illustrated on the left, into the stepped bore 31 of the nipple 30 by lowering the electrode holder 10 with tie rod 65 while the nipple, together with the graphite electrode 2, are located immediately below. Pressure medium is then admitted to the cylinder 67 in the space above the piston 68 to move the expanding mandrel 69 downwardly to move each of the sectors of the expanding member 63 into the position which is shown on the right and in which the hook-shaped ends 36 engage the supporting face 32. By then pulling up on the tie rod 65, the top face 3 of graphite electrode 2 is then pressed against the contact face 12a of the current-supply tube 12. The entire system is then ready for operation.

In order to release the electrode, it is first rested on an underlying support, and the tie rod 65 is relieved of load, i.e. lowered. Then pressure is applied in the space below the piston 68 so that the expanding mandrel 69 lifts. As a result of the action of the retraction device 37, the hook-shaped ends 36 are retracted from the supporting face 32 until they assume the position shown on the left in FIG. 5. The tie rod 65 can then be lifted together with the expanding member and removed from the nipple. The graphite electrode 2 can then be lengthened by screwing a further portion 1 on to the nipple 30. Since the fresh portion also has an identical nipple 30 at its top, the expanding member can then again be introduced into the stepped bore 31 in the previously described manner, and the already described cycle repeated.

Referring to FIG. 6, the nipple 80 again consists of a double cone having a top screw-thread 80a and a bottom screw-thread 80b. However, between the two halves of the nipple there is formed a circumferential groove 81 the upper face of which constitutes the supporting face 32. In this case, an expanding member 82, which acts inwardly when tightened, is arranged in the electrode holder 10 comprising the current-supply tube 12, the coolant cavity 13 and the conductive metal sheet 14. The expanding member consists of C-shaped hooks having lower hook-shaped ends 36 for engagement in the circumferential groove 81, and upper arms 85 which are braced against a supporting flange 84 which is fitted at the bottom end of a tie rod 83.

Provided in the current-supply tube 12 is a conically tapered control element 86 which co-operates with corresponding control faces 87 on the C-shaped hooks.

In the left-hand half of the Figure, the expanding member is shown in a position in which the nipple 80 can be introduced and removed. The current-supply tube 12 is raised, and the expanding-member hooks can be moved in a positive manner into the illustrated position by means of a retraction device, not illustrated, but similar to that shown at 37 in FIGS. 3 and 5. The right-hand half of FIG. 6 shows the position assumed by the expanding member 82 after the nipple 80 has been introduced and the current-supply tube 12 has been lowered. Then, the tapered control element 86 presses the control faces 87 towards the middle, so that the hook-shaped ends 38 engage below the supporting face 32. The circumferential groove 81 may also consist of several portions.

The form of construction shown in FIG. 6 is particularly suitable for large and heavy electrodes 2.

FIG. 7 shows the top of an electrode like that in FIG. 6, with the difference, however, that nipple 90 has no bottom screw-thread and is not screwed into the appropriate electrode subjacent portion. The nipple and electrode subjacent portion are, rather, made in one piece, meaning that to the extent that the nipple is actually embodied, only about half as much of it exists as the nipples shown in FIGS. 1 through 6.

We claim:

1. In a graphite nipple (4) for use in a composite electrode system, the nipple having means (4b) associated with a first end (FE) for uniting the nipple (4) with a first graphite electrode portion (1) and a second, opposite end (SE) for projecting from the first graphite electrode portion (1) when the nipple (4) is united therewith, a surface of the nipple (4) projecting to the second end (SE) thereof having a screw thread (4a) for connecting the nipple with a second graphite electrode portion, whereby to extend with the second graphite electrode portion the electrode formed by the nipple and first electrode portion for continued use in an electric furnace, the electric furnace having electrode holder means (10) for holding the electrode from the nipple at least a portion (7) of the electrode holder means (10) not being made of graphite, the electrode holder (10) cooperating with the nipple (4) for supporting the graphite electrode portion (1) in the electric furnace, the improvement comprising:

a supporting face (32) on the nipple (4), other than the screw thread (4a), for shape-locking engagement with the non-graphite portion (7) of the electrode holder means (10) when the nipple (4) is supporting the graphite electrode portion (1) in the electric furnace.

2. In a graphite nipple according to claim 1 having the longitudinal bore extending at least part way through the nipple from the second end of the nipple toward the first end, whereby to receive a tie-rod portion of the electrode holder, the further improvement wherein the supporting face is within the nipple and accessible from the bore.

3. In a graphite nipple according to claim 2 wherein the means associated with the first end of the nipple for uniting the nipple with the first graphite electrode portion comprises a second screw thread on a surface of the nipple extending to the first end of the nipple for threaded connection with the first graphite electrode portion, and the longitudinal bore extends through the nipple from the second end thereof to the first end thereof, the further improvement:

wherein the supporting face comprises a widened portion of the longitudinal bore in the first end of the nipple; and further comprising a nut in shape-locking engagement with the widened portion of the longitudinal bore, the nut having means for threadingly receiving the tie-rod portion of the electrode holder.

4. A graphite nipple according to claim 2, wherein the supporting face comprises a transverse bore intersecting the longitudinal bore, whereby a metal pin may be removably inserted in shape-locking engagement with the nipple for supporting engagement with the tie-rod portion of the electrode holder.

5. A graphite nipple according to claim 2, wherein the supporting face comprises a radially-outward step in the longitudinal bore intermediate the ends of the bore, whereby to receive an expandable tie-rod portion of the electrode holder in shape-locking engagement.

6. A graphite nipple according to claim 5, and further comprising an expandable tie-rod having at least one hook on an end at the step within the longitudinal bore, whereby an expanding mandrel of the electrode holder can expand the tie-rod until its hooked end is in shape-locking engagement with the supporting-face step.

7. A graphite nipple according to claim 1, wherein the supporting face comprises a face of a groove which is closest to the second end of the graphite nipple, the groove extending about at least portions of the surface of the nipple projecting to the second end thereof, whereby hook-shaped ends of an expanding member of the electrode holder may be moved toward the nipple into shape-locking engagement with the groove-face supporting face thereof.

8. A graphite nipple according to claim 7, wherein the means associated with the first end of the nipple for uniting the nipple with the first graphite electrode portion comprises means forming the same as one piece.

* * * * *

UNITED STATES PATENT AND TRADEMARK OFFICE
CERTIFICATE OF CORRECTION

PATENT NO. : 4,495,624

DATED : January 22, 1985

INVENTOR(S) : Uwe Reimpell, et al.

It is certified that error appears in the above-identified patent and that said Letters Patent is hereby corrected as shown below:

Col. 7, line 55, "61" should be -- 63 --.

Col. 9, line 2, "the" should be -- a --.

Signed and Sealed this

Ninth Day of July 1985

[SEAL]

Attest:

DONALD J. QUIGG

*Attesting Officer*      *Acting Commissioner of Patents and Trademarks*